Feb. 14, 1961 J. B. TIEDEMANN 2,971,410
ROLL MOUNTING FOR A DRAW ROLLING MILL
Original Filed Oct. 26, 1953 8 Sheets-Sheet 1
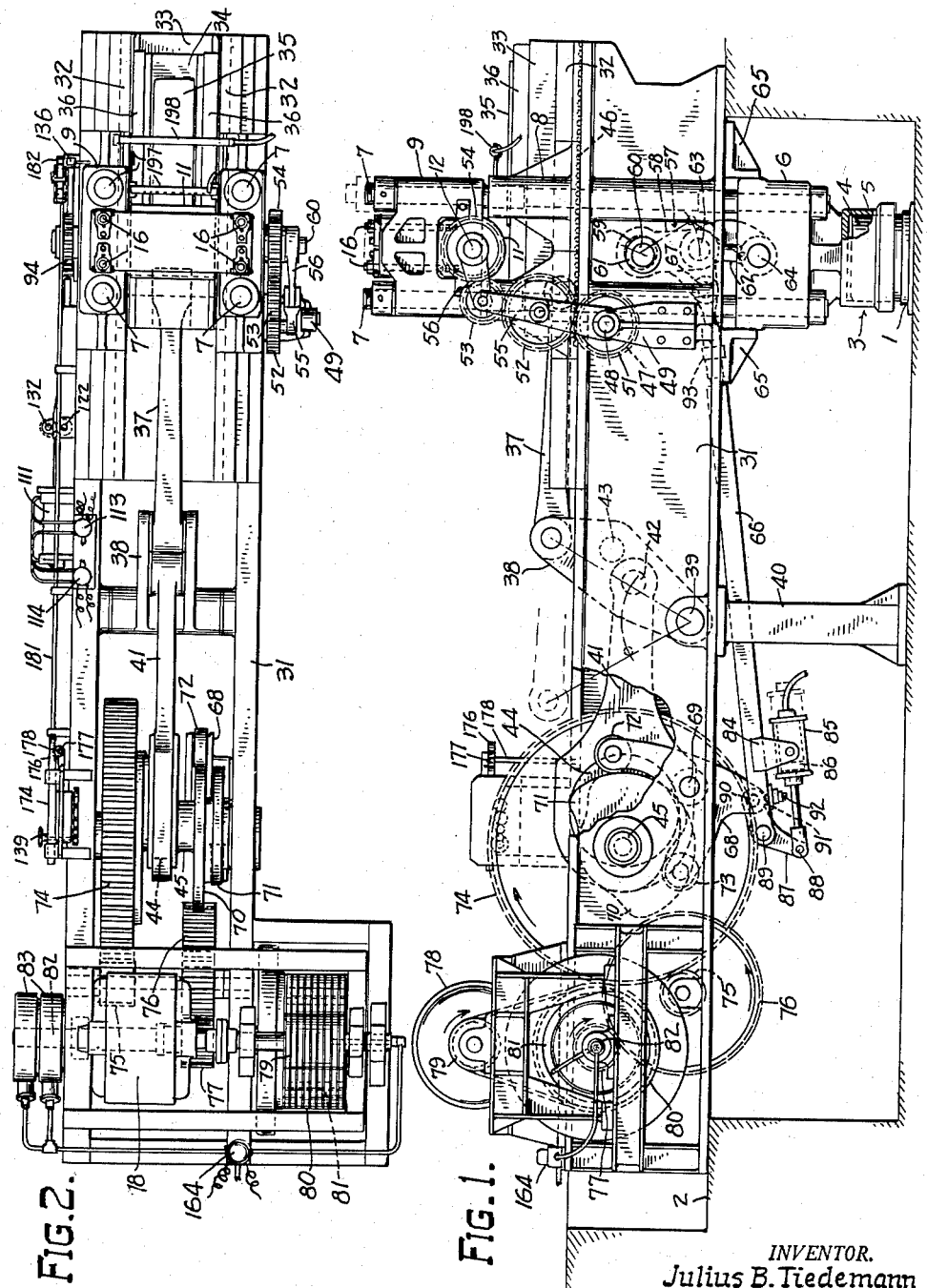
INVENTOR.
Julius B. Tiedemann
BY
ATTORNEYS.

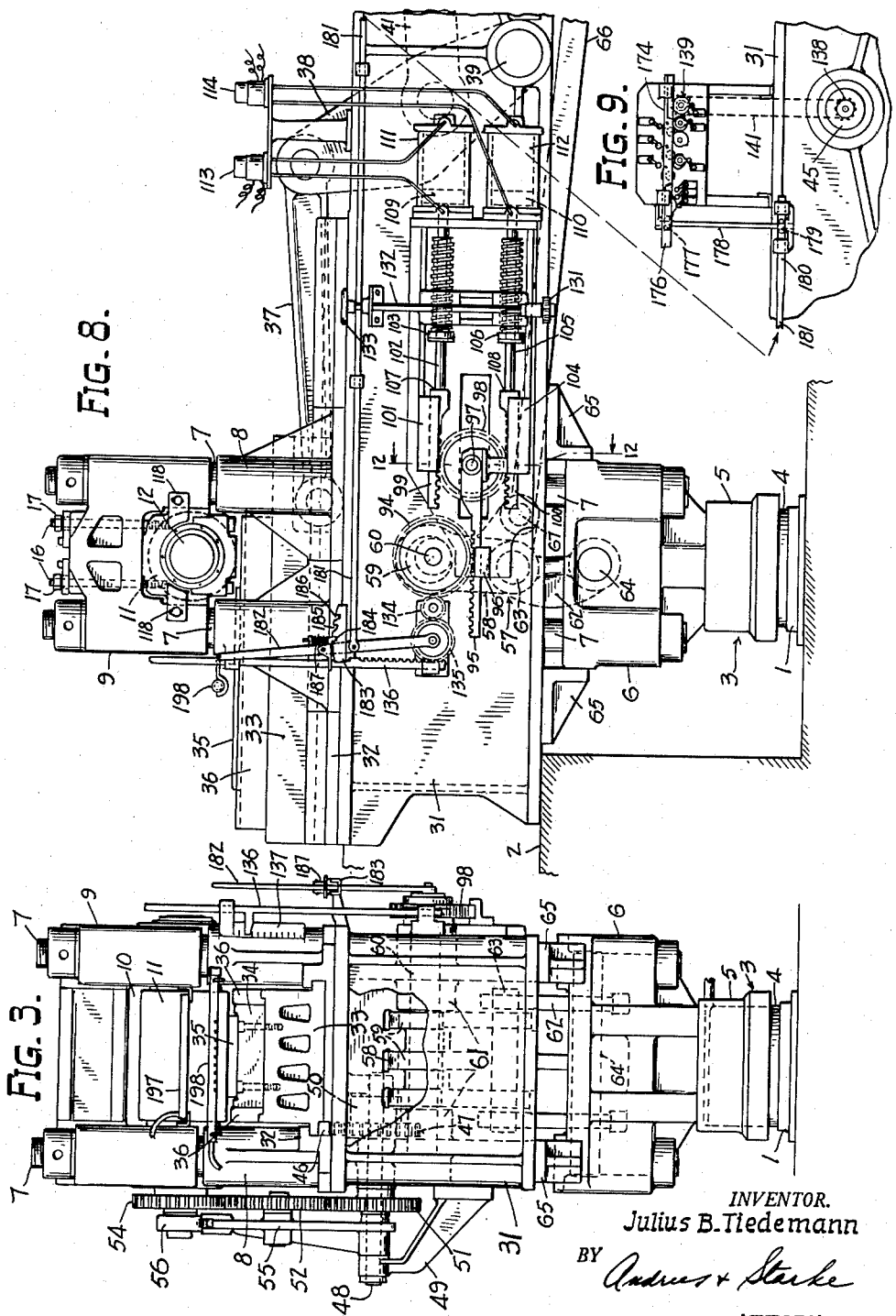

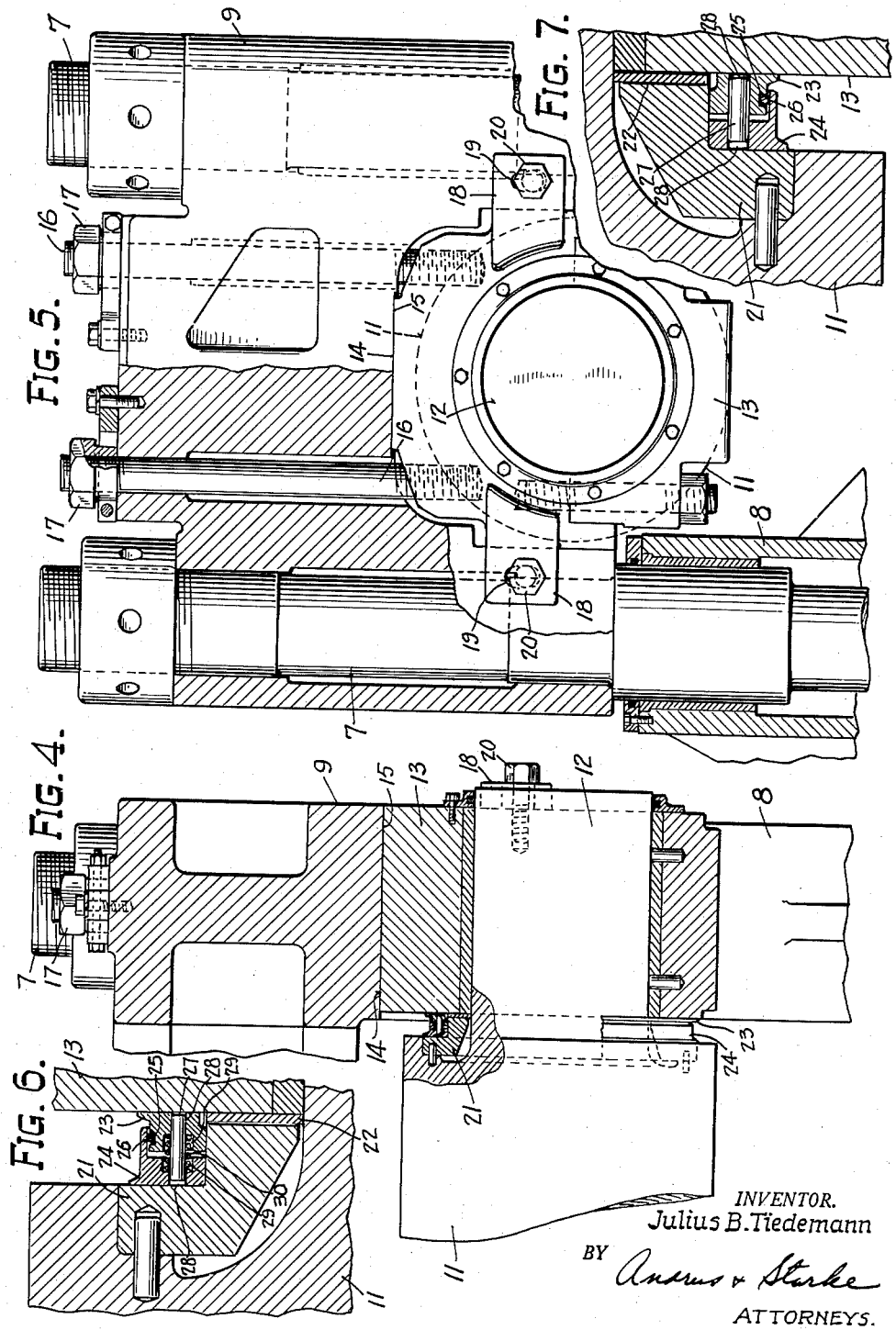

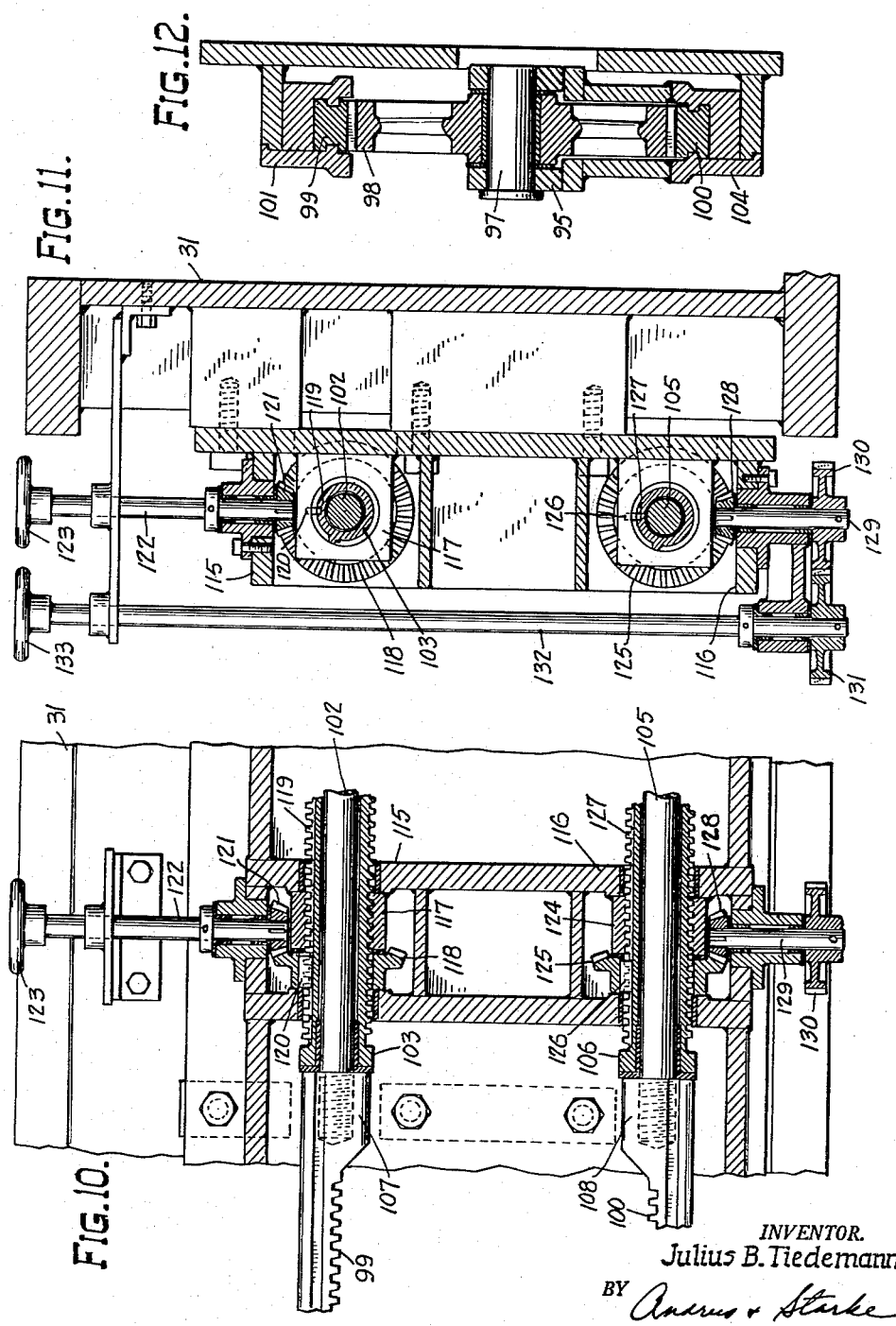

Feb. 14, 1961  J. B. TIEDEMANN  2,971,410
ROLL MOUNTING FOR A DRAW ROLLING MILL
Original Filed Oct. 26, 1953  8 Sheets-Sheet 5
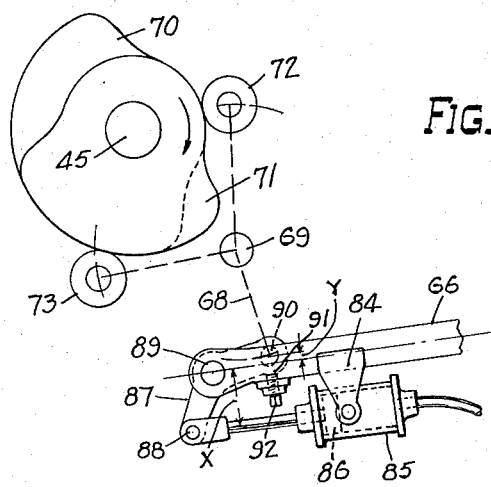
FIG.13.
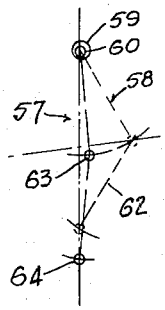
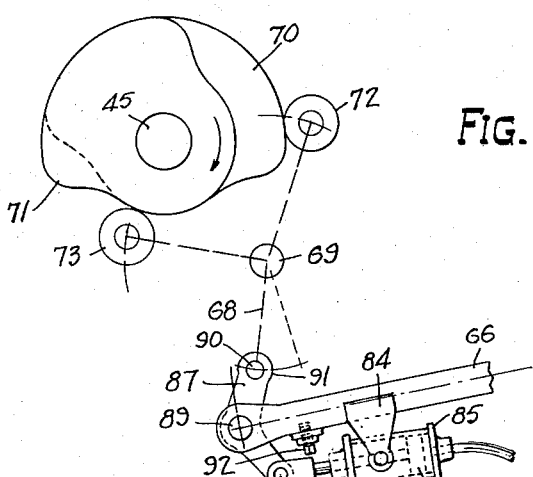
FIG.14.
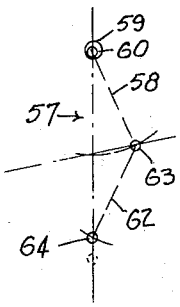
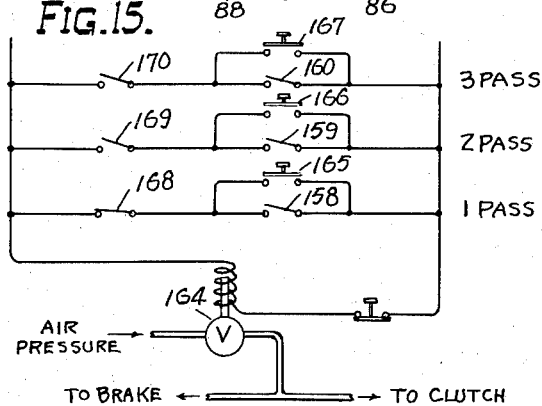
FIG.15.
INVENTOR.
Julius B. Tiedemann
BY
ATTORNEYS.

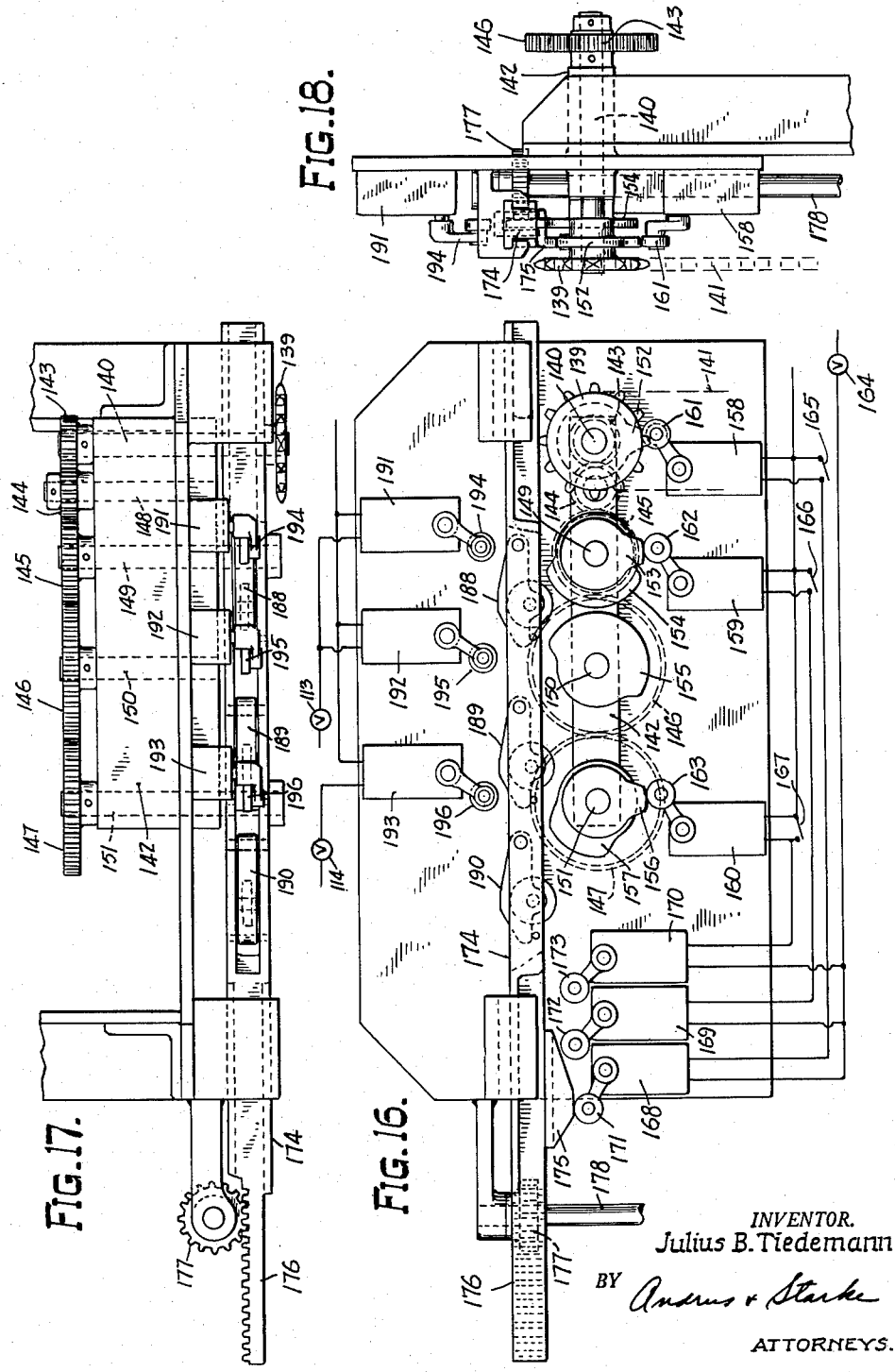

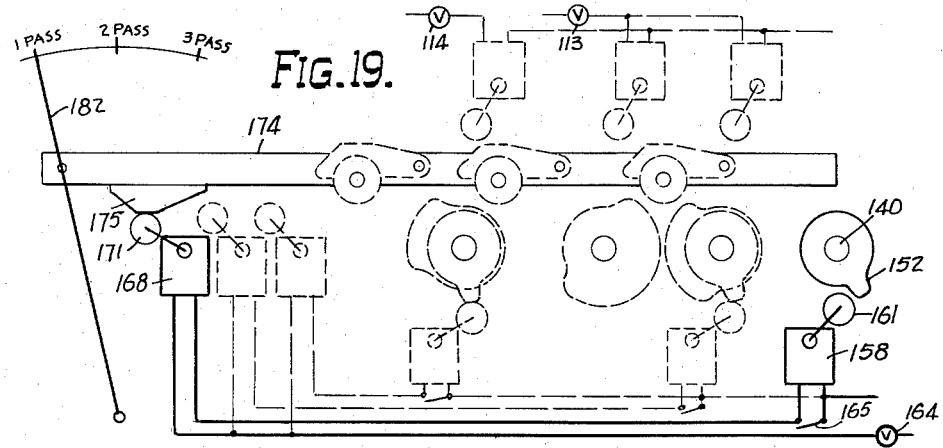
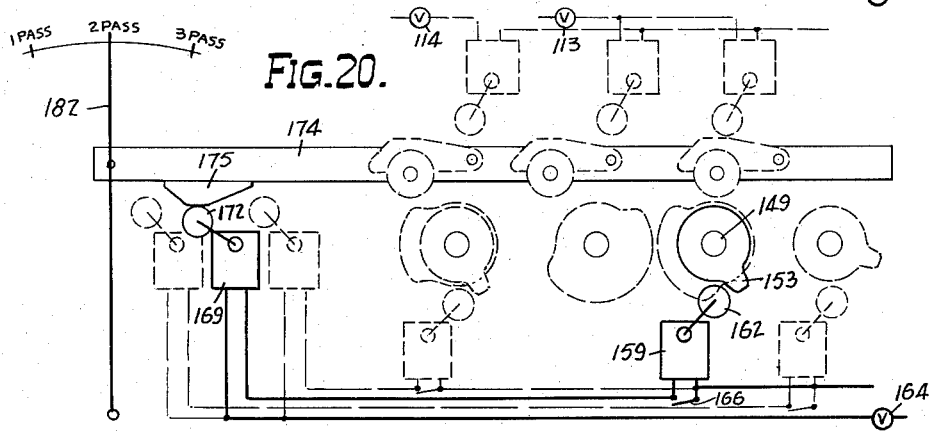
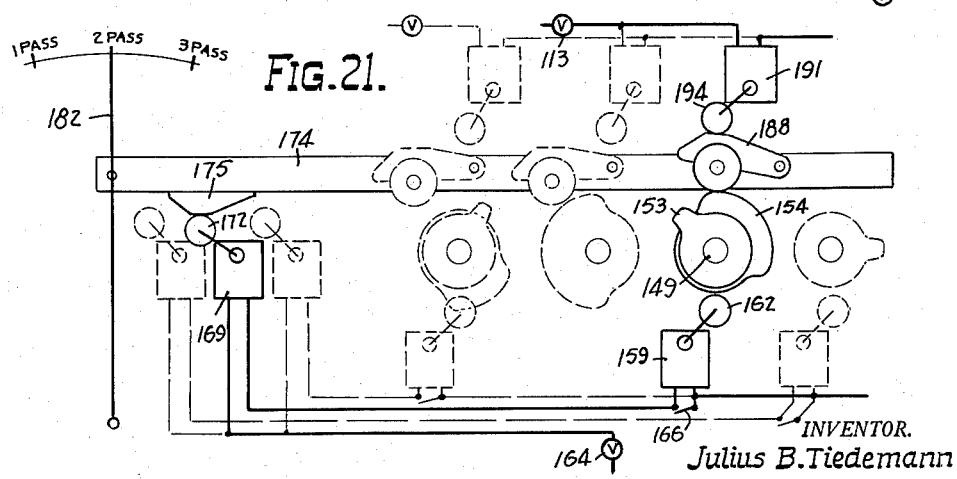

Feb. 14, 1961 J. B. TIEDEMANN 2,971,410
ROLL MOUNTING FOR A DRAW ROLLING MILL
Original Filed Oct. 26, 1953 8 Sheets-Sheet 8
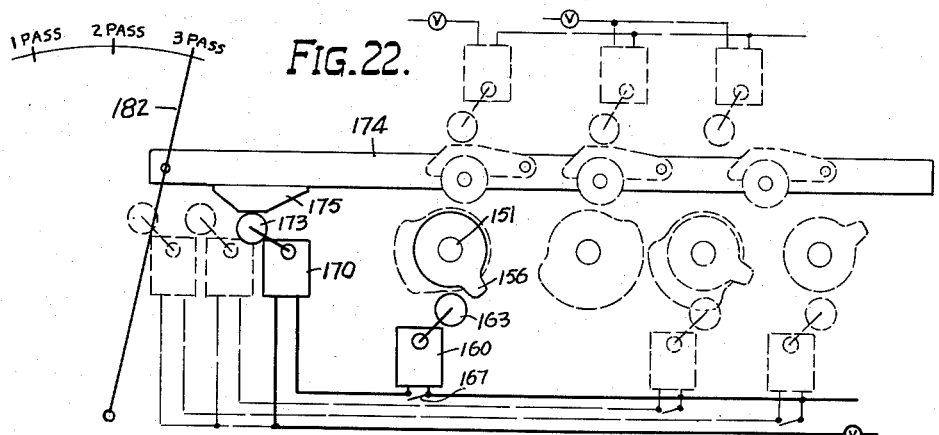
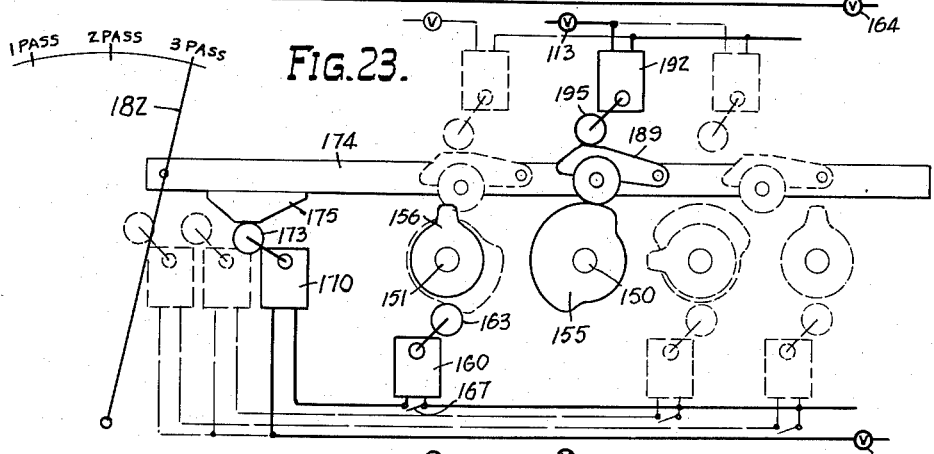
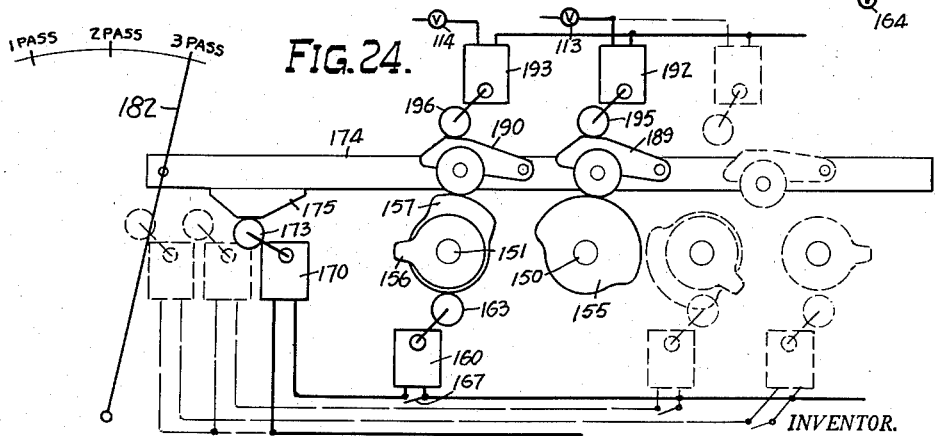
INVENTOR.
Julius B. Tiedemann
BY
ATTORNEYS.

United States Patent Office 2,971,410
Patented Feb. 14, 1961

2,971,410

ROLL MOUNTING FOR A DRAW ROLLING MILL

Julius B. Tiedemann, Milwaukee, Wis., assignor to A. O. Smith Corporation, Milwaukee, Wis., a corporation of New York Application Mar. 26, 1954, Ser. No. 418,966, which is a continuation of application Ser. No. 388,177, Oct. 26, 1953, now abandoned. Divided and this application Mar. 13, 1958, Ser. No. 721,175

8 Claims. (Cl. 80—55)

This invention relates to a roll mounting for a draw rolling mill and is a divisional application of copending application Serial No. 418,966, filed March, 26, 1954, and entitled "Draw Rolling Mill," now U.S. Patent No. 2,896,485, issued July 28, 1959, and which in turn is a continuation of application Serial No. 388,177, filed October 26, 1953, entitled "Draw Rolling Mill" and now abandoned.

The present invention is directed to a draw rolling mill capable of making up to three automatic passes at progressively varying pressure roll heights in the process of shaping a heated blank placed therein. This multiple pass rolling mill permits more efficient utilization of a single blank heating and eliminates the necessity for expensive reheating of the blanks for subsequent passes.

The present rolling mill is provided with certain novel safety features which prevent freezing of the machine and automatically relieve or release the pressure roll when excessive pressures are encountered, thereby preventing damage of the mechanism and eliminating down-time for unfreezing the machine and placing it back in operation.

More specifically, the rolling mill is provided with a pressure roll which is lowered and raised by a toggle mechanism. The closing and opening of the toggle mechanism is accomplished by oscillation of a cam-actuated rocker arm acting through a rod connecting the toggle mechanism and the rocker arm. Adjacent the end of the rod connected to the rocker arm, a safety device is provided for automatically opening the toggle mechanism which thereby releases the pressure roll should the roll pressure exceed a predetermined maximum amount.

By a series of adjustments the rolling mill may be predeterminately set to take progressively larger bites at matic passes at a heated blank placed therein and when successive passes are employed the pressure roll may be predeterminately set to take progressively larger bites at the blank. To attain progressively varying bites by the pressure roll on succeeding automatic passes, an eccentric mounted on an upper toggle pivot shaft is caused to rotate a predetermined amount after each pass thereby lowering the center of the pivot a predetermined amount. The lowered upper toggle pivot reflects a corresponding lowering of the roll when the toggle mechanism is again closed for the next succeeding pass. Rotation of the upper toggle shaft a predetermined amount is brought about by a series of stop-controlled racks and gears actuated by a pair of air cylinders controlled by cam-actuated solenoid valves.

The rolling mill may be set for single pass operation or for two or three successive automatic passes by a series of cam systems which are operated from a driven shaft. The cams operate switches for controlling a clutch in accordance with the number of passes to be made, and in the case of successive automatic passes they also operate switches for solenoid valves which control the flow of air to air cylinders for setting the pressure roll height for each succeeding automatic pass.

The drawings furnished herewith illustrate the best mode of carrying out the invention as presently contemplated and set forth hereinafter.

In the drawings:

Figure 1 is a side elevation of the draw rolling mill of this invention;

Fig. 2 is a top plan view of the rolling mill;

Fig. 3 is a front elevation of the rolling mill;

Fig. 4 is an enlarged fragmentary view partially in section showing the pressure roll trunnioned in its bearing;

Fig. 5 is an enlarged fragmentary side view of Fig. 4 partially in section showing the pressure roll suspension;

Figs. 6 and 7 are enlarged fragmentary sectional views showing the sealing means between the pressure roll and the bearings;

Fig. 8 is a side elevation of part of the rolling mill of this invention taken on the side opposite that of Figure 1 showing the roll setting mechanism;

Fig. 9 is a fragmentary extension of Fig. 8 and shows the means for automatically setting the rolling mill for a predetermined number of passes;

Fig. 10 is an enlarged fragmentary view partially in section showing the stop sleeve adjustment mechanism;

Fig. 11 is a sectional end view of the stop sleeve adjustment mechanism;

Fig. 12 is an enlarged sectional view taken on line 12—12 of Fig. 8;

Fig. 13 is a diagrammatic view showing the safety mechanism for relieving the pressure roll;

Fig. 14 is a diagrammatic view showing the safety mechanism in the tripped position with the connecting rod between the toggle mechanism and the rocker arm dropped to an ineffective position;

Fig. 15 is a diagrammatic view showing the electrical system controlling the brake and clutch valve;

Fig. 16 is an enlarged front view showing the means for setting the rolling mill for a predetermined number of automatic passes;

Fig 17 is a top plan view of the means for setting the roll shown in Fig. 16;

Fig. 18 is an end view of the means for setting the roll shown in Fig. 16;

Fig. 19 is a diagrammatic view similar to Fig. 16 showing in full lines certain elements effective during the single pass operation;

Fig. 20 is a diagrammatic view similar to Fig. 19 with a pass control rod set for two pass operation showing in full lines certain elements effective during the first pass;

Fig. 21 is a diagrammatic view similar to Fig. 20 showing in full lines certain elements effective during the second pass of a two pass operation;

Fig. 22 is a diagrammatic view similar to Fig. 19 with the pass control rod set for three pass operation showing in full lines certain elements effective during the first pass;

Fig. 23 is a diagrammatic view similar to Fig. 22 showing in full lines certain elements effective during the second pass of a three pass operation; and Fig. 24 is a diagrammatic view similar to Fig. 22 showing in full lines cetrain elements effective during the third pass of a three pass operation.

As shown in the drawings, the rolling mill comprises a base structure 1 which rests in a pit provided in a foundation 2 and supports a pneumatic air cushion 3.

The pneumatic air cushion 3 is comprised generally of a stationary plunger 4 secured to the base 1 and a cylinder 5 disposed for vertical movement relative to the plunger. A compressible fluid, such as air is introduced within cylinder 5 through a suitable line, not shown, and serves to cushion the downward thrusts of the roll.

A generally rectangular lower crosshead 6 is mounted centrally on cylinder 5. A plurality of tie rods 7 extend vertically upward through crosshead 6 adjacent the corners thereof and continue upwardly through vertical frame elements 8. The upper extremities of tie rods 7 are adapted to receive a generally rectangular upper crosshead 9 which is secured against relative movement with respect to the rods by suitable bolts which are threaded on the upper ends of the respective rods. The underside of crosshead 9 is provided with a transverse cavity 10 in which working roll 11 is mounted. The weight of the crossheads 6 and 9, their connecting tie rods 7, and the working roll 11 are counterbalanced by the pneumatic air cushion 3. These members move as a unit against the compressible fluid in the air cushion 3 as they are caused to be lowered during operation.

The trunnions 12 of roll 11 are mounted in split bearings 13 secured to the underside of crosshead 9. To more effectively withstand the heat to which the roll and its bearings may be subjected, the trunnions 12 and bearings 13 may be provided with coolant channels, not shown, through which water or other coolant can be circulated. The bearings 13 are provided with a finished horizontal upper surface 14 which bears against a complementary lower surface 15 of crosshead 9. A plurality of threaded members 16 extend downwardly through the crosshead 9 and are threadedly engaged within suitable openings in the bearings 13. To retain surfaces 14 and 15 in contact and prevent relative vertical movement of the bearings and roll with respect to the crosshead, nuts 17 threadedly engage the members 16. Suitable lock plates are provided to secure the nuts 17 from turning.

To set the original working height of the roll 11, shims, not shown, of predetermined thickness may be inserted between the surfaces 14 and 15 of the bearings and crosshead, respectively.

The bearings 13 are secured against transverse movement with respect to the crosshead 9 by a pair of keeper plates 18 which are formed on the outer ends of bearings 13. The plates 18 are provided with a vertically extending slot 19 adjacent their ends through which threaded members 20 secure the projections to the crosshead 9, thereby preventing transverse movement of the bearing relative to the crosshead. The slots 19 permit limited vertical movement of the bearing and roll for the purpose of inserting the aforementioned shims between the complementary bearing and crosshead surfaces 14 and 15, respectively.

Although bearings 13 are precluded from relative movement with respect to the crosshead 9, the roll 11, supported in the bearings, is permitted limited axial movement with respect to the bearings by sealing means disposed therebetween.

The sealing means is disposed between each bearing 13 and the corresponding end of the roll 11. For this purpose each end of the roll 11 has a stepped wearplate ring 21 which is secured to the roll 11 radially outward of the corresponding trunnion 12. A thrust washer 22 is disposed between the wearplate 21 and the bearing 13. A pair of complementary sealing rings 23 and 24 are disposed radially outward of washer 22 and between and in bearing relationship with bearing 13 and wearplate 21. The ring 24 is generally spaced from the ring 23 and is provided with a flange which overlaps the ring 23 radially outwardly. A groove 25 is provided in the periphery of ring 23 and has an O-ring 26 composed of a material having high heat withstanding properties, such as silicone rubber, disposed therein between the complementary rings 23 and 24 to seal the passage therebetween from scale or other foreign matter which the roll may pick up from the blank being rolled. While the roll 11 rotates within bearing 13, the sealing rings 23 and 24 are free to rotate relatively to the roll and the bearing, but are precluded from relative rotation with respect to each other by a plurality of circumferentially spaced dowel pins 27 disposed within aligned holes 28 in the rings. The length of dowel pins 27 is such as to permit limited axial movement of roll 11 relative to bearings 13.

The opposed ends of each alternate pair of aligned holes 28 are recessed to provide a spring cavity 29 adapted to receive a helical spring 30 which encompasses the respective pin 27, as shown in Fig. 6. Springs 30 normally retain the rings 23 and 24 in contact with the bearing 13 and wearplate 21, respectively, and thereby prevent foreign matter from entering the bearing. The described sealing means further permits limited relative axial movement of the roll with respect to the bearing, takes up any slack due to wear between the members, and allows for expansion of the roll due to the heat inherent in the draw rolling operation.

The bed 31 of the rolling mill rests on foundation 2 and is disposed between the upper crosshead 9 and lower crosshead 6. The bed 31 extends transversely between the frame elements 8, the latter being secured to the bed in any suitable manner. On the upper surface of the bed, longitudinal ways 32 are provided on which a platen 33 is disposed for sliding reciprocatory motion. A die member 34 for forming a heated blank 35 is removably secured on platen 33. Longitudinal tracks or spank plates 36 are preferably removably secured on the platen 33 along the longitudinal edges of the die member 34 on which the working roll is adapted to bear on its final pass at the blank. It is desirable that the upper surfaces of the spank plates be coextensive with the upper surface of the blank upon completion of the final rolling pass. As one alternative method of setting the initial height of roll 11 with respect to the die member, shims, not shown, of predetermined thickness may be inserted between the platen 33 and the spank plates 36.

To reciprocate platen 33 on ways 32 one end of a link 37 is pivotally attached to the rearward portion of the platen. The other end of link 37 is pivotally secured between the upper end of a bifurcated beam 38. The lower end of beam 38 is pivotally mounted on shaft 39 supported in bearings mounted on the frame. Pivotal movement of beam 38 on shaft 39 imparts a reciprocatory movement to platen 33 through the link 37.

To additionally support the frame and drive mechanism of the rolling mill, a plurality of columns 40 extend upwardly from the foundation 2 to the frame.

Movement is imparted to beam 38 and the limits of reciprocation of platen 33 are established by a connecting rod 41 which is pivotally mounted at one end on a shaft 42 extending transversely through beam element 38. When a shorter reciprocating stroke of the platen 33 is desired, the shaft 42 with mounted connecting rod 41 may be moved to position 43 of the bifurcated beam 38, thereby decreasing the pivotal limits of beam 38 about shaft 39.

The driven end of connecting rod 41 is disposed about an eccentric 44 which is keyed on rotatable shaft 45 mounted in the frame of the machine. As the shaft 45 is caused to rotate, the eccentric 44 causes connecting rod 41 to oscillate beam 38 resulting in reciprocating straight line motion of the platen 33.

Rotation of roll 11 during the working stroke of platen 33 may be effected by the pressure between the roll and the blank 35 or between the roll, the blank and the spank plates 36, or the roll may be positively driven. The latter may be accomplished by positively imparting rotation to the working roll 11 by movement of the platen 33. A rack 46 with its teeth disposed downwardly is secured to the underside of platen 33 and engages gear 47 which is mounted on shaft 48 supported by the bed of the machine and a bed extension 49. A clutch 50 is provided on shaft 48 so that the rotary motion of gear 47 is imparted to shaft 48 only during the working stroke of the platen. A second gear 51 is keyed on shaft 48 and acts through a train of gears 52, 53 and 54 whose speed reduction imparts the platen speed to the working roll periphery, the latter gear 54 being keyed to the working roll trunnion 12.

The gear train driving the roll 11 is arranged to compensate for roll height adjustments to be described hereinafter and remains enmeshed during lowering and raising of the roll. A link 55 is pivotally mounted on shaft 48 and provides a bearing member for gears 52 and 53. The pivotally mounted link 55 permits gears 52 and 53 to rotate about gear 51 but retains gears 52 and 53 in a fixed position with respect to each other. A link 56 connects the bearing for gear 53 with that of gear 54 and thereby limits or restricts the pivotal movement of link 55 about shaft 48. Thus, as roll 11 is lowered for the working stroke, link 55 pivots counterclockwise and moves gears 52 and 53 to the left as viewed in Figure 1, yet retains the drive gears enmeshed. As the roll is raised, the link 55 pivots clockwise and retains the gear entrainment.

To raise and lower the working roll 11 in proper sequence with the platen stroke, a toggle mechanism 57 is employed. The upper toggle link consists of a bell crank 58 which is mounted at its upper end to pivot on an eccentric 59. The eccentric 59 in turn is keyed to the upper toggle shaft 60 and is adapted to rotate therewith. The shaft 60 is rotatably mounted in bearings 61 which are provided in the bed of the machine.

The lower toggle link 62 is pivotally attached to bell crank 58 at the center pivot 63 of the toggle mechanism. The lower toggle link is pivotally mounted on a shaft 64 which is fixedly secured to the upper side of the lower crosshead 6 in vertical alignment with upper toggle shaft 60. To lower the roll 11 the toggle mechanism 57 is moved into its closed position; i.e., the center pivot 63 is moved rearwardly or very nearly into vertical alignment with the toggle shaft 60 and 64, causing the connected crossheads 6 and 9 and working roll 11 to move downwardly within the lower crosshead guide brackets 65 affixed to the bed 31 against the pressure fluid in the air cushion 3. The roll 11 is raised by the action of the toggle mechanism 57 when the same is opened; i.e., the center pivot 63 is moved forwardly.

The toggle mechanism 57, as shown in Figure 1, is sequentially closed and opened by a connecting rod 66 which is at one end pivotally connected to bell crank 58, as indicated at 67. The rod 66 is actuated by a rocker arm 68 which is connected to the other end of rod 66 through a safety mechanism to be hereinafter described. The rocker arm 68 is disposed to pivot about a shaft 69 mounted on the frame of the mill and is pivotally actuated by a pair of cams 70 and 71 fixedly secured on shaft 45. A pair of follower rollers 72 and 73 disposed on rocker arm 68, are alternately in engagement with the respective actuating portions of cams 70 and 71. As the cams 70 and 71 rotate with shaft 45 and cause rocker arm 68 to pivot about its shaft 69, the toggle mechanism 57 is correspondingly closed and opened, the cam sequence and timing corresponding to the working stroke of platen 33.

To rotate eccentric shaft 45 and thus operate platen 33 and raise and lower the roll 11 through toggle mechanism 57 in timed sequence with the platen, a large drive gear 74 is fixedly secured on shaft 45. Drive gear 74 is motivated by the train of gears 75, 76 and 77 adapted to produce the desired speed reduction. A motor 78 may be utilized to drive the rolling mill with the motor torque being transferred from the motor sheave 79 to a clutch sheave 80 having an attached flywheel by a series of belts or the like. An air clutch 81 is provided within clutch sheave 80 on shaft 82 which is mounted on the frame of the machine. The gear 77 is fixedly secured on the clutch shaft 82 and accordingly, when the clutch is engaged, gear 77 through its gear train rotates shaft 45 and places the platen 33 and roll 11 in longitudinal and vertical motion, respectively. An air-operated band type brake 83 on shaft 82 may be activated to stop the mechanism. With the drive arrangement described, the motor may remain in operation independently of the rolling mechanism.

Machines of the type described are generally built to accommodate a predetermined maximum pressure loading between the rolling members. If this maximum pressure is exceeded the machine will freeze or stop with its component members being under an extreme strain, resulting in damaged parts, or the outright fracture of parts. In either case downtime results and expensive repairs are necessary.

The rolling mill of the present invention is equipped with safety features to prevent overloading of the working roll with consequent damage. Figures 1, 13 and 14 show a safety mechanism associated with the connecting rod 66 which will release the toggle mechanism 57 when the roll 11 encounters an overload.

The safety mechanism, as best shown in Figures 1, 13 and 14, includes a pair of brackets 84 attached to rod 66 which pivotally support an air cylinder 85. A piston 86 is disposed rearwardly within the cylinder 85, see Fig. 13, and is normally retained in that position by the cylinder pressure. The piston rod extends rearwardly from cylinder 85 and is pivotally attached to one end of a bell crank 87 at pivot 88. The rocker arm end of the connecting rod 66 is bifurcated and is pivotally attached to the center pivot 89 of bell crank 87. The opposite end of bell crank 87 is pivotally attached to rocker arm 68 at pivot 90. Beneath the normally operative position of pivot 90, as shown in Figs. 1 and 13, bell crank 87 is provided with an enlarged portion 91 which is disposed between the bifurcation of the rod 66 and abuts against an adjusting screw 92 which is disposed on the rod 66 and one of which projects upwardly through the bifurcation.

The pressure in cylinder 85 normally acts against piston 86 to maintain the bell crank surface 91 against the adjusting screw 92. With the bell crank so disposed, the pivot 90 between bell crank 87 and rocker arm 68 remains offset a distance Y from the center line of rod 66. During normal operation, the safety mechanism merely oscillates with the rod 66.

The maximum load at which the rolling mill will normally operate is the product of the cylinder pressure acting through a moment arm X, which is the distance between the piston rod center line and pivot 89 of the bell crank 87. If in the course of operation the toggle mechanism 57 will not close due to excessive pressures encountered by roll 11, the rocker arm 68 being positively actuated by cam 70 will impose a force acting through the offset distance Y which will overcome the cylinder pressure acting through distance X. The force will unseat the bell crank surface 91 from its normal position on adjusting screw 92 causing the bell crank to pivot at 89 thereby forcing piston 86 forwardly against the cylinder pressure. The action of the safety mechanism is best shown in Figs. 13 and 14. In Fig. 14, the rod 66 is shown in the dropped position. With the safety mechanism so disposed the connecting rod 66 will be free of the action of the rocker arm and the roll 11 will be relieved by the air pressure in balancing cylinder 3.

If the roll encounters an excessive load during actual rolling when the toggle mechanism 57 is fully closed, the force acting to break or open the toggle is transmitted through rod 66 and acts through offset distance Y to overcome the cylinder pressure as before and drop the rod 66, thereby releasing the toggle mechanism 57 and relieving the roll. After the undue stress has been safely relieved the cylinder pressure will reset the safety mechanism.

The safety mechanism described may be set for varying maximum loads by adjusting the pressure in cylinder 85 or by adjusting the distance Y by means of the screw 92.

The safety mechanism may be set to operate for varying maximum loads by a further adjustment provided on connecting rod 66. Adjacent the toggle connection 67, the rod is provided with a turnbuckle nut 93 for lengthening and shortening the rod, as shown in Fig. 1. Variations in the length of connecting rod 66 will vary the distance between the dead center position of the toggle and the toggle center pivot for the fully closed mechanism. According to the well-known formulas governing toggle operation, it is known that for a given maximum force transmitted through rod 66, the toggle load will vary inversely as the distance between the toggle dead center position and the toggle center pivot for the fully closed mechanism. Therefore, as this distance is increased the toggle will support a decreased load for a given force transmitted through rod 66. Conversely, where this distance is decreased, the toggle will support an increased load for the same force transmitted through rod 66. Thus, as the length of the connecting rod 66 is increased by means of the turnbuckle nut 93, the safety mechanism will be caused to open for a lesser maximum toggle load. Conversely, as the length of the connecting rod is decreased, the safety mechanism will open for a correspondingly higher toggle load. At maximum load, the toggle will close almost to a straight line. An exact straight line position of the toggle members should never be allowed, for under such conditions the connecting rod 66 would transmit no force to break the safety mechanism in the event of an excessive load on the working roll.

The rolling mill of this invention is further provided with a mechanism to subject the heated blank to one, two or three automatic passes by the working roll with the roll taking progressively varying bites at the blank with each subsequent pass. This characteristic of the rolling mill permits more effective and efficient utilization of the heating to which the blank is previously subjected. With a conventional single pass rolling mill, the apparatus must be reset for each pass and the heat loss of the blank is generally so great as to require reheating before each pass. The present invention provides for setting the rolling mill in advance for up to three passes so that the passes are quickly and automatically made before the blank becomes too cold to draw roll.

When only a single pass on the heated blank is to be made, the proper operating roll height with respect to the die member may be attained by shimming down the roll or shimming up the die member 34 or spank plates 36 to the height desired. To attain uniformity among a plurality of single pass rolled blanks, the roll should be adjusted so that it will roll on the spank plates 36 and stress the tie rods a given amount for each blank being drawn rolled. Strain gauges, not shown, may assist in the shim adjustment.

When multiple passes are to be made on the heated blank, the roll height for the first pass is adjusted as described above except that on the first pass the working roll will roll only on the blank and will not touch the spank plates 36. For additional automatic passes the roll height is adjusted by eccentric 59 which is rotated within the upper toggle link 58. As eccentric 59 is rotated a given amount the upper toggle shaft 60 is lowered, and on any subsequent pass, the roll is further correspondingly lowered. In order to attain uniformity among a plurality of blanks for multiple pass operation, the eccentric 59 should, for the final pass, set the working roll to roll on spank plates 36 and stress the tie rods a predetermined amount.

To rotate eccentric 59 and thereby adjust the roll height, a gear 94 is keyed to the upper toggle shaft 60. Rotation of gear 94 effects a corresponding rotation of the eccentric. Gear 94 is rotated by a rack 95 which is slidably disposed in bracket 96 affixed to the bed of the machine. The end of rack 95 is fixedly secured to a shaft 97 of a floating gear 98. The floating gear 98 is disposed for engagement with a pair of diametrically opposed racks 99 and 100.

The upper rack 99 is slidably disposed in guide bracket 101 secured to the bed of the machine, and a rod 102 disposed rearwardly therefrom extends slidably through a stop sleeve 103.

The lower rack 100 is slidably disposed in guide bracket 104 secured to the bed of the machine, and a rod 105 disposed rearwardly therefrom extends slidably through stop sleeve 106.

Racks 99 and 100, respectively, have projections 107 and 108, disposed rearwardly thereof, for engagement with stop sleeves 103 and 106. As the rack 99 is moved rearwardly through stop sleeve 103 the gear 98 is rotated moving the rack 95 rearwardly a given amount. Rack 95 in turn actuates gear 94 a given amount which sets the eccentric 59 for the next succeeding pass. A like operation of rack 100 results in a further rotation of eccentric 59. In three pass operation the roll height is sequentially set for the second and third passes by racks 99 and 100. In two pass operation the roll height is set for the second pass by rack 99.

To actuate the racks 99 and 100 and thereby set the working roll height for succeeding passes, the ends of the racks are provided with pistons 109 and 110, respectively, which are disposed in air cylinders 111 and 112, respectively. Air entering the cylinder 111 in front of the piston 109 drives the piston rearwardly to actuate the rack 99 until the projection 107 on the rack abuts against the stop sleeve 103. The lower rack 100 is operated in like manner. The cylinders 111 and 112 are also provided with air inlets rearwardly of the pistons in order to reset the roll for each subsequent blank to be rolled. Two-way solenoid valves 113 and 114, respectively, control the entry of air into cylinders 111 and 112 from a source, not shown.

As was previously pointed out, the angle through which eccentric 59 is rotated by the racks 99 and 100, to thereby lower the working roll is established by the distance between the respective rack projections 107 and 108 and their corresponding stop sleeves 103 and 106. These respective distances may be varied by modifying the stop sleeve positions. A pair of housings 115 and 116 are disposed, respectively, about the sleeves 103 and 106 and are fixedly secured to the frame of the machine. Sleeves 103 and 106 are adapted to move longitudinally through the housings and are externally threaded. Within upper housing 115 an internally threaded nut 117 is threadedly engaged with the sleeve 103 with the nut being fixedly secured to the housing. Thus, as the sleeve is rotated it moves rearwardly or forwardly with respect to the nut 117.

A bevel gear 118 is disposed loosely on the sleeve adjacent nut 117. A longitudinal spline groove 119 is provided in the sleeve 103 and a key 120 disposed in groove 119 locks the bevel gear 118 and sleeve 103 from relative rotational movement with respect to each other but permits relative longitudinal movement between these members. As the bevel gear 118 is rotated the threaded sleeve 103 is turned through the stationary nut 117, thereby moving the sleeve longitudinally relative to the gear with key 120 sliding in spline groove 119.

A second bevel gear 121 engages gear 118 and is actuated by a shaft 122 which extends outside of the housing. A handwheel 123 may be employed to turn the shaft and thereby set the stop sleeve 103 at a predetermined position which in turn establishes the predetermined roll height for the second pass.

The stop sleeve adjustment for the lower rack 100 is similar to that described for the upper rack 99. A stationary nut 124 engages the externally threaded sleeve 106. A bevel gear 125 is disposed about the sleeve with a key 126 engaging a spline groove 127 to lock the gear and sleeve from relative rotational movement yet permitting relative longitudinal movement between the members. A bevel gear 128, having a short shaft 129 extending downwardly outside the housing 116, actuates bevel gear 125. A gear 130 is affixed to shaft 129 below housing 116 and engages a gear 131. The shaft 132 of gear 131 extends upwardly adjacent shaft 122 and is likewise provided with a handwheel 133. The operation of the lower sleeve adjustment is similar to that described in connection with the upper sleeve adjustment with both sleeves being employed to predeterminately set the roll height for three pass operation.

To set the stop sleeves 103 and 106 for the roll height desired, a gauge is provided to show the roll height or the extent of the changes in height. An idler 134 and gear 135 transmit the motion of gear 94 actuated by the air cylinders 111 and 112 to a rack 136 which is disposed for vertical movement in stationary guides. The rack 136 has an indexing portion disposed at the upper end thereof as shown in Fig. 3. A gauge plate 137 provided with graduated marks is secured to the frame of the machine adjacent the rack 136. As the rack 136 is caused to move relative to the gauge plate 137, the change in roll height is readily discernable to the operator. The stop sleeve adjustment can thereby be accurately set.

The mechanism for setting the rolling mill for a predetermined number of automatic passes is shown in detail in Figures 15 through 24. A sprocket 138, see Fig. 9, is secured on the eccentric shaft 45 and drives sprocket 139 secured on shaft 140 by means of roller chain 141. The shaft 140 extends through and is supported by a housing member 142 secured to the frame of the machine. A gear 143 is secured on shaft 140 on the opposite side of the housing 142 from sprocket 139 and is driven by the sprocket, and in turn drives an idler gear 144 and a series of gears 145, 146 and 147. The pitch diameter of the respective gears are such that gear 145 is adapted to move with half the speed of gear 143 and gears 146 and 147 are adapted to move with one-third of the speed of gear 143. The shaft 148 for idler 144 and the shafts 149, 150 and 151 for the respective gears 145, 146 and 147 are all horizontally aligned with sprocket shaft 140 and are transversely parallel to each other. The shafts 148, 150 and 151 extend through housing member 142 and are supported thereby. The shaft 148 for idler 144 is supported by housing 142 but does not extend therethrough.

On the opposite side of housing 142 from the enmeshed gears 143, 145, 146 and 147, respectively, a series of cams are mounted on the shafts 140, 149, 150 and 151. A switch operating cam 152 is mounted on shaft 140. Shaft 149 has mounted thereon two cams, a switch operating cam 153 and adjacent thereto a dog activating cam 154. A dog activating cam 155, longitudinally aligned with cam 154, is mounted on shaft 150. Shaft 151 is also provided with two cams, a switch operating cam 156 and a dog activating cam 157, the latter being in longitudinal alignment with dog activating cams 154 and 155. The arrangement of the foregoing mechanism is such that as eccentric shaft 45 is rotated, the shafts 140, 149, 150 and 151 and their affixed cams are rotated simultaneously, with the cams 153 and 154 on shaft 149 rotating at half the speed of cam 152 on shaft 140, and cam 155 on shaft 150 and cams 156 and 157 on shaft 151 rotating at one-third the speed of cam 152 on shaft 140. While cam 152 makes one complete revolution for each pass of the roll, the cams 153 and 154 make one complete revolution for two passes of the roll, and cam 155, 156 and 157 make one complete revolution for three passes of the roll.

To actuate the main clutch 81 and brake 83 in accordance with the number of roll passes desired, switches 158, 159 and 160 are placed in operating arrangement with cams 152, 153 and 156, respectively. Switches 158, 159, and 160 are provided with cam operated dogs 161, 162 and 163, respectively, which open the switches when the respective dogs ride on a raised portion of the cams. The switches 158, 159 and 160 are arranged electrically in parallel to each other, as shown in Fig. 15 and in series with a solenoid operated air valve 164 which controls the air from a source, not shown, to the clutch 81 and brake 83. The timing of the respective cams determines the length of time the switches remain closed and accordingly effectuates the drive for one, two or three passes, respectively, of the roll. As will be described hereinafter, only one of the switches 158, 159 and 160 is effective at a given time while the other two remain ineffective.

Figs. 15 and 16 show switches 158, 159 and 160 as being retained open before a pass or a sequence of passes is begun by engagement of the raised portion of the cams 152, 153 and 156 with the respective switch dogs. Until the raised portion of the cams 152, 153 and 156 roll off their respective dogs, the switches remain open and the roll drive cannot be actuated. In order to start the drive from this position, hand-operated switches 165, 166 and 167 are placed in parallel, respectively, with switches 158, 159 and 160. When manually closed, the hand switch corresponding to the number of passes to be made actuates the solenoid valve 164 to release the brake and engage the clutch 81 and thereby places the drive in motion. With the machine drive thus actuated, the switch operating cam corresponding to the number of passes to be made rides off its respective switch dog and thereby closes the cam operated switch for that circuit.

As was pointed out earlier, when the clutch 81 is engaged, the switch operating cams 152, 153 and 156 all rotate simultaneously at their varying speeds to actuate their respective switch dogs. As was further pointed out only one of the switches 158, 159 or 160 are actually effective at any given time depending on the number of passes of the roll desired. To effectuate but one of the switches 158, 159 or 160, a second switch is placed in series with the respective switches as best illustrated in the electrical diagram of Fig. 15. For single pass operation, the switch 168 is closed as will be described hereinafter, and thereby switch 158 is effectuated. For two pass operation, the switch 169 is closed effectuating switch 159, and for three pass operation the switch 170 is closed effectuating switch 160.

To close the switches 168, 169 and 170, switch dogs 171, 172 and 173 are provided thereon, respectively. As shown in Fig. 16, the switches 168, 169 and 170 are longitudinally spaced and longitudinally aligned with respect to each other.

To set the rolling mill for a predetermined number of passes, a control rod 174 is disposed in suitable guides for longitudinal movement above the switch dogs 171, 172 and 173 for switches 168, 169 and 170, respectively, and above dog activating cams 154, 155 and 157. A downwardly projecting cam 175 is affixed forwardly on rod 174 and is disposed to actuate the switch dogs 171, 172 and 173 as the rod is moved longitudinally. The switch dogs are spaced so that cam 175 may engage but one dog at a time and thereby close the corresponding switch. In Figs. 16 and 19, cam 175 is shown closing switch 168 thereby setting the rolling mill for single pass operation. In Figs. 20, and 21 the cam 175 is shown closing switch 169 thereby setting the roll for two pass operation. And in Figs. 22 through 24 the switch 170 has been closed by cam 175 thereby setting the roll for three pass operation.

Mechanism is provided for the operator to set the control rod 174 at the forward end of the machine. A rack 176 extends forwardly from the rod 174 and is engaged by a small spur gear 177. The shaft 178 of gear 177 extends vertically downward and is rotatably supported by the frame of the machine. A pinion gear 179 is affixed to the lower end of shaft 178 as shown in Fig. 9. A rack 180 extends rearwardly of a connecting rod 181 and engages the pinion 179 such that longitudinal movement of the rod 181 effects a like movement of control rod 174. The connecting rod 181 extends forwardly to the front end of the rolling mill through suitable guide brackets and is pivotably secured to an actuating lever 182. The lower end of lever 182 is pivotally mounted on the shaft for gear 135. A notched roll setting bracket 183 is fixedly secured on the frame of the machine above the position of connecting rod securement on lever 182 and is disposed longitudinally adjacent the lever. The bracket 183 is provided with three spaced notches 184, 185 and 186 on its upper surface to be engaged by a pawl 187 connected to the lever. The notches of bracket 183 are spaced and positioned so that when pawl 187 engages notch 184, the cam 175 on control rod 174 will actuate switch dog 171 and thereby close switch 168 setting the machine for single pass operation. Moving the lever 182 to engage pawl 187 in notch 185 will move cam 175 to actuate switch dog 172 and thereby set the machine for two pass operation. When pawl 187 is placed into engagement with notch 186, the cam 175 will actuate switch dog 173 and set the rolling mill for three pass operation.

After either or both of the stop sleeves 103 and 106 have been predeterminately set by utilizing their respective handwheels 123 and 133 to set the roll height in accordance with the pattern of operation, solenoid valves 113 and 114 operate to automatically set the roll height in proper sequence by controlling the air supply to cylinders 111 and 112, respectively. To automatically control the operation of either or both of the solenoid valves 113 and 114, three dogs 188, 189 and 190 are pivotally mounted on the control rod 174. The dogs 188, 189 and 190 are disposed on rod 174 in the same vertical plane as the dog activating cams 154, 155 and 157 mounted respectively on shafts 149, 150 and 151. The dogs are spaced on the control rod 174 so that when the rolling mill is set for two pass operation the dog 188 will be engaged and lifted by cam 154 while the other dogs remain ineffective. When the control rod is set for three pass operation, dog 189 will be engaged and lifted by cam 155 and dog 190 will be engaged and lifted by cam 157 while dog 188 remains ineffective. When the rolling mill is set for single pass operation all of the dogs remain ineffective. Figs. 16 through 24 show in detail the various control rod positions and the operation of dogs 188, 189 and 190.

Longitudinally aligned above the control rod 174 are three valve switches 191, 192 and 193 with depending switch dogs 194, 195 and 196, respectively. The switches 191 and 192 are connected in parallel and actuate solenoid valve 113 while switch 193 actuates solenoid valve 114. The switches 191, 192 and 193 are spaced from each other so that when dog 188 is engaged and lifted by cam 154, the dog will engage switch dog 194 and thereby close switch 191 actuating solenoid valve 113. With cam 154 making one revolution for two passes of the roll it should be noted that the solenoid valve activating portion of the cam is disposed on the second pass portion of the cam, the first pass being made at initial roll height without eccentric adjustment.

When control rod 174 is in position for three pass operation, dog 189 will engage switch dog 195, and dog 190 will engage switch dog 196 of switches 192 and 193, respectively. Cams 155 and 157 make one complete revolution for three passes of the rolling mill. On the first pass initial roll height without eccentric adjustment is utilized and thus on the first one-third revolution of the cams neither cam actuates its corresponding valve switch. On the second pass, cam 155 actuates solenoid valve 113 and sets the roll height accordingly, while cam 157 remains inactive. On the third pass, cam 155 continues to hold closed switch 192 to actuate valve 113 while cam 157 has now also closed switch 193 to actuate solenoid valve 114, thereby resetting the roll for the final pass at the blank.

To operate the rolling mill of the present invention the operator must predeterminately set the machine for the desired number of passes to be made on the blank and for the desired roll height at which succeeding passes are to be made.

In the case of three pass operation, the roll height for the first pass is adjusted by shimming the roll, the spank plate or the die members or any combination thereof. The second pass roll height is adjusted by setting the upper stop sleeve 103 by means of handwheel 123 so that when the air is applied to cylinder 111 ahead of piston 109 the eccentric 59 on the upper toggle shaft 60 will be turned the proper amount. Stop sleeve 106 is similarly set by handwheel 133 to position eccentric 59 properly for the third pass. Further, the lever 182 must be placed in notch 186 of the notched bracket 183. With the lever 182 so disposed, cam 175 on control rod 174 will close switch 170 and set the rolling mill for three pass operation as shown in Figs. 22 through 24. With the roll adjustments and the lever 182 set for three passes, the heated blank is then placed on the die member and locked in place by suitable gripper mechanism, not shown.

To place the machine in motion for three passes the hand operated switch 167 is closed activating solenoid valve 164 to disengage the brake 83 and engage clutch 81. The clutch will then remain engaged for one revolution of cam 156 or for a time period equivalent to three passes of the rolling mill. At the proper time in the pass sequence, cams 155 and 157 will close switches 192 and 193, respectively, activating the solenoid valves 113 and 114, respectively, to thereby lower the roll height for the working strokes of the last two passes. When the cam 156 has completed a revolution, the raised portion of the cam will strike switch dog 163 opening switch 160, thereby deactivating solenoid valve 164 and disengaging the clutch and applying the brake. The switches 192 and 193 will also be opened as the cams 155 and 157 allow dogs 189 and 190, respectively, on control rod 174 to fall to their inactive position, thereby deactivating the solenoid valves 113 and 114 and permitting the introduction of air into the cylinders 111 and 112 behind the pistons 109 and 110 to return the working roll to its initial height. The blank is then removed, completing the three pass operation.

When more than one pass is to be made upon the blank it is generally desirable to preheat the roll and the die members prior to operation so that heat transfer from the blank to those members will be minimized. The preheat is readily accomplished by means of a gas flame. A pipe 197 provided with a plurality of spaced gas orifices and connected by a flexible tube to a gas source is placed in suitable hook members adjacent the roll. A similar pipe 198 is spaced above the die member. With gas pipes 197 and 198 so disposed the machine is run through a single, interrupted pass to complete the preheat.

For two pass operation, the roll height for the initial pass may be set in the manner hereinbefore described in connection with the first pass of a three pass operation. For the second pass the upper stop sleeve 103 is set by handwheel 123 as in the case for the second pass of three pass operation. The lever 182 is then set in notch 185 of notched bracket 183 setting control rod 174 for two pass operation. With the control rod so disposed cam 175 will close switch 169. The hand operated switch 166 is then closed energizing the solenoid 164 to engage the clutch and start the rolling mill in motion. The clutch will remain engaged for one revolution of cam 153 for a time period equivalent to two passes of the rolling mill. In proper sequence cam 154 will close switch 191 activating solenoid 113 to set the roll height for the second pass, as shown in Fig. 21. On completion of the two pass operation, the clutch is again disengaged by engagement of the raised portion of switch cam 153 with dog 162 to set the brake and the roll is returned to its initial height by reversing the air in cylinder 111 as solenoid valve 113 is deenergized and eccentric 59 returned to its initial position.

When desired, cams and switches may be arranged so that both cylinders 111 and 112 are placed in operation to activate racks 99 and 100 on the second pass of two pass operation to set the roll height.

In the case of single pass operation, the roll height is simply adjusted by shims as described in connection with the first pass of two or three pass operation. Lever 182 is set for one pass operation with cam 175 of control rod 174 closing switch 168. Hand switch 165 is then closed to set the rolling mill in motion, and after a single pass the cam 152 will open switch 158 and thereby disengage the clutch and set the brake to stop the operation of the machine. Where desired, cams and switches may also be provided to set the roll for single pass operation by utilizing one or both cylinders 111 and 112 to activate one or both racks 99 and 100.

Various modes of carrying out the invention are contemplated as being within the scope of the following claims particularly pointing out and distinctly claiming the subject matter which is regarded as the invention.

I claim:

1. A pressure roll mounting for a rolling mill comprising a pair of aligned bearing members secured in spaced relation to each other, a pressure roll trunnioned in the bearing members, a pair of annular, complementary axially aligned retaining rings disposed between the roll and each said bearing member with each pair of rings being individually spaced to intimately contact the end surfaces of the roll and the bearing members, respectively, means individually connecting each pair of rings to retain the rings from relative rotation with respect to each other, biasing means disposed between each individual pair of rings to retain the same in intimate contact with the bearing members and roll, respectively, and a gasket annularly disposed between each individual pair of rings, said rings and gasket serving to protect the bearing members from foreign matter and permitting limited axial movement of the roll with respect to the bearing members to compensate for wear in the elements and heat expansion in service.

2. In a draw rolling mill, a pressure roll provided with trunnions, a pair of axially aligned bearing members secured in spaced relation to each other and being adapted to receive the trunnions of said roll to rotatably support the roll, an annular groove provided in each end surface of the roll radially outward of the roll trunnions, an annular wearplate fixedly secured in each said groove and being provided with a stepped surface disposed axially outward from the roll, a thrust washer disposed for limited axial movement between each wearplate and the corresponding bearing member, a pair of annular, complementary, axially aligned retaining rings being disposed radially outward from a portion of the stepped surface of each wearplate and axially between each wearplate and the corresponding bearing member with each pair of rings being individually spaced to intimately contact the wearplate and the corresponding bearing member, a plurality of pins extending axially through each pair of individual rings to retain the rings from relative rotation with respect to each other, spring means disposed between each individual pair of rings to retain the same in intimate contact with the wearplate and corresponding bearing member, and a gasket disposed between each individual pair of rings to retain the space therebetween free of foreign matter, said spaced individual rings and gasket serving to protect the bearing members from foreign matter and permitting limited axial movement of the roll with respect to the bearing members to compensate for wear in the elements and heat expansion in service.

3. In a a draw rolling mill, a bed, a die member supported on the bed, an upper crosshead disposed above the bed and a lower crosshead disposed beneath the bed and being joined together by a plurality of tie rods to form an integral unit disposed for vertical reciprocation with respect to the bed, means to reciprocate said integral unit with respect to the bed, a pair of axially aligned bearing members mounted beneath the upper crosshead, a roll trunnioned in the bearing members and being adapted to cooperate with said die member to form a workpiece therebetween with clearance being provided between the end surfaces of the roll and the bearing members, means to secure the bearing members against relative movement with respect to the upper crosshead, a pair of complementary, annular, axially aligned retaining rings disposed in each said clearance with each individual pair of rings being maintained in spaced relation to intimately contact the end surface of the roll and the bearing members, respectively, means to retain each said ring from relative rotation with respect to its complementary ring, spring means disposed between each individual pair of rings to maintain the rings in intimate contact with the bearing members and roll, respectively, and a gasket disposed between each individual pair of rings, said rings and gasket serving to protect the bearing members from foreign matter and permitting limited axial movement of the roll with respect to the bearings to compensate for wear in the elements and expansion due to heat while the roll height is positively secured relative to the die member.

4. In a draw rolling mill, a bed, a die member supported on the bed, an upper crosshead disposed above the bed and lower crosshead disposed beneath the bed and being joined together by a plurality of tie rods to form an integral unit disposed for vertical reciprocation with respect to the bed, means to reciprocate said unit with respect to the bed, a pair of axially aligned bearing members mounted in spaced relation beneath the upper crosshead, a roll trunnioned in the bearing members and being adapted to cooperate with said die member to form a workpiece therebetween upon reciprocation of said unit and horizontal movement of said die member with clearance being provided between the end surfaces of the roll and the bearing members, the opposed complementary surfaces between the upper crosshead and the bearing members being finished to receive shim elements therebetween and thereby set the roll height with respect to the die member, a plurality of threaded members extending downwardly through the upper crosshead and threadedly engaging the bearing members thereby maintaining the complementary finished surfaces in engagement to maintain the bearing members against relative vertical movement with respect to the upper crosshead, means to secure the bearing members against relative horizontal movement with respect to the upper crosshead, a pair of axially aligned retaining rings disposed in spaced relation within the clearance between the end surface of the roll and the corresponding bearing member, means to retain said rings from relative rotation with respect to the complementary ring, biasing means disposed between each pair of rings to maintain the rings in intimate contact with the roll and bearing members, respectively, and a gasket disposed between each pair of rings, said rings and gasket serving to protect the bearing members against entry of foreign matter and permitting limited axial movement of the roll with respect to the bearings to compensate for wear in the elements and expansion due to heat while the roll height is positively secured relative to the die member.

5. A pressure roll mounting for a rolling mill comprising a pair of aligned bearing members secured in spaced relation to each other, a pressure roll trunnioned in the bearing members, a pair of annular, complementary axially aligned retaining rings disposed between an end of the roll and the corresponding bearing member with the rings being spaced and disposed in contiguous relation with the end of the roll and the bearing member, respectively, biasing means for urging each ring into intimate contact with said roll and bearing member, respectively, means connecting each pair of rings together for preventing relative rotation therebetween and permitting relative axial movement therebetween, and a flexible sealing member disposed in the space between said rings, said sealing member and said rings serving to protect the bearing member from foreign matter and permitting limited axial movement of the roll with respect to the bearing member to compensate for wear in the elements and heat expansion in service.

6. A pressure roll mounting for a rolling mill comprising a pair of aligned bearing members secured in spaced relation to each other, a pressure roll trunnioned in the bearing members, a pair of annular, complementary axially aligned retaining rings disposed between an end of the roll and the corresponding bearing member with the rings being spaced and disposed in contiguous relation with the end of the roll and the bearing member, respectively, said rings being freely rotatable with respect to the roll and the bearing member and one of said rings having an axially extending portion disposed in overlapping relation with a portion of the other ring, means connecting said rings for preventing relative rotation with respect to each other, biasing means for urging each ring into intimate contact with said roll and bearing member, respectively, and a flexible sealing member disposed between the overlapping portions of the rings, said sealing member and said rings serving to protect the bearing member from foreign matter and permitting limited axial movement of the roll with respect to the bearing member to compensate for wear in the elements and heat expansion in service.

7. In a draw rolling mill, a pressure roll provided with trunnions, a pair of bearing members secured in spaced relation to each other and disposed to receive the trunnions of the roll to rotatably support the roll, bearing support means connected to the bearing members to support the same, a pair of annular, complementary axially aligned retaining rings disposed between an end of the roll and the corresponding bearing member with the rings being spaced and disposed in contiguous relation with the end of the roll and the bearing member, respectively, biasing means for urging each ring into intimate contact with said roll and bearing member, respectively, a plurality of pins extending axially through each pair of individual rings to retain the rings from relative rotation with respect to each other, a flexible sealing member disposed in the space between said rings, said sealing member and said rings serving to protect the bearing member from foreign matter and permitting limited axial movement of the roll with respect to the bearing member to compensate for wear in the elements and heat expansion in service, and keeper means connecting the bearing members to the support means for preventing relative axial movement of the bearing members with respect to the support means.

8. In a draw rolling mill, a bed, a die member supported on the bed, an upper crosshead disposed above the bed and a lower crosshead disposed beneath the bed and being joined together by a plurality of tie rods to form an integral unit disposed for vertical reciprocation with respect to the bed, means to reciprocate said integral unit with respect to the bed, a pair of axially aligned bearing members mounted beneath the upper crosshead, a roll trunnioned in the bearing members and being adapted to cooperate with said die member to form a workpiece therebetween with clearance being provided between the end surfaces of the roll and the bearing members, a pair of annular, complementary axially aligned retaining rings disposed between an end of the roll and the corresponding bearing member with the rings being spaced and disposed in contiguous relation with the end of the roll and the bearing member, respectively, biasing means for urging each ring into intimate contact with said roll and bearing member, respectively, slidable axially extending connecting means connecting the corresponding rings together and preventing relative rotation therebetween and permitting relative axial movement therebetween, and a flexible sealing member disposed in the space between said rings, said sealing member and said rings serving to protect the bearing member from foreign matter and permitting limited axial movement of the roll with respect to the bearing member to compensate for wear in the elements and heat expansion in service.

References Cited in the file of this patent

UNITED STATES PATENTS

| | | |
|---|---|---|
| 2,057,924 | Smith | Oct. 20, 1936 |
| 2,243,009 | Kingsbury | May 20, 1941 |

FOREIGN PATENTS

| | | |
|---|---|---|
| 895,137 | Germany | Nov. 2, 1953 |

UNITED STATES PATENT OFFICE
CERTIFICATE OF CORRECTION

Patent No. 2,971,410  February 14, 1961

Julius B. Tiedemann

It is hereby certified that error appears in the above numbered patent requiring correction and that the said Letters Patent should read as corrected below.

Column 1, line 47, for "to take progressively larger bites at" read -- for making one, two, or three auto- --; column 2, line 58, for "cetrain" read -- certain --.

Signed and sealed this 10th day of October 1961.

(SEAL)
Attest:

ERNEST W. SWIDER
Attesting Officer

DAVID L. LADD
Commissioner of Patents

USCOMM-DC